April 22, 1958     E. J. DIEBOLD     2,832,025
VARIABLE SPEED INDUCTION MOTOR
Filed Dec. 15, 1954     3 Sheets-Sheet 1

FIG. 1a. — LOW RESISTANCE ROTOR

FIG. 1b. — HIGH RESISTANCE ROTOR

—— = RATED VOLTAGE
– – – = LOWER VOLTAGE

FIG. 2.

INVENTOR.
EDWARD JOHN DIEBOLD
BY
*Ostrolenk & Faber*
ATTORNEYS

April 22, 1958  E. J. DIEBOLD  2,832,025
VARIABLE SPEED INDUCTION MOTOR
Filed Dec. 15, 1954  3 Sheets-Sheet 2

INVENTOR.
EDWARD JOHN DIEBOLD
BY
Ostrolenk & Faber
ATTORNEYS

April 22, 1958     E. J. DIEBOLD     2,832,025
VARIABLE SPEED INDUCTION MOTOR Filed Dec. 15, 1954     3 Sheets-Sheet 3

INVENTOR.
EDWARD JOHN DIEBOLD
BY
Ostrolenk & Faber
ATTORNEYS

United States Patent Office 2,832,025
Patented Apr. 22, 1958

2,832,025

VARIABLE SPEED INDUCTION MOTOR

Edward John Diebold, Ardmore, Pa., assignor to I-T-E Circuit Breaker Company, Philadelphia, Pa., a corporation of Pennsylvania Application December 15, 1954, Serial No. 475,446

16 Claims. (Cl. 318—238)

My invention relates to a variable speed control means and more particularly is directed to a novel control circuit to be inserted in the rotor of an induction motor to control the speed thereof.

Electric motors commonly in use are of either the D.-C. or induction type. Although alternating current has generally been accepted as the standard form of electrical energy, D.-C. motors have been used in installations where it is desirable to obtain variable speed control, since these motors inherently lend themselves to variable speed operation. However, D.-C. motors are relatively expensive compared to induction motors and their commutators render them expensive and less safe in operation.

In the prior art arrangement, the control circuitry for the D.-C. motor is inserted in the stator circuit and hence, the full electrical energy supplied to the motor must pass through the control circuit. Furthermore, it is necessary to provide a rectifier having a capacity to withstand the full magnitude of electrical energy supplied to the motor. The entire assembly comprising the D.-C. motor with armature power and field power along with the electronic and magnetic amplifier control for speed variation is expensive. Furthermore, the commutator used on the D.-C. motor requires frequent maintenance and overhaul. In corrosive, dusty or low pressure applications (airplanes) the commutator of the D.-C. motor becomes a major problem for maintaining dependable operation.

Although induction motors are considerably less expensive and require less maintenance than D.-C. motors, they have not been successfully adapted with variable speed controls.

In the main, induction motors are used as constant speed drives in industry. In the past, attempts have been made to adapt the induction motor with a variable speed control means in one of two manners. In the first type of prior art installation, a low resistance rotor is used and the voltage applied to the stator is modified. However, this arrangement has not proved satisfactory since variable speed control exists only between relatively high critical speed and a synchronous speed of the rotor.

For all speeds below the critical speed, the induction motor is unstable and hence will stall. Furthermore, the degree of variable speed control between the critical speed and synchronous speed is limited and hence, this type of control has not been accepted as a substitute for the variable speed D.-C. motor.

More recent attempts to solve the problem of instability of the induction motor for low speeds have resulted in a high resistance rotor induction motor in which the motor is stable during low speed operations. However, this arrangement, although stable over almost the entire speed range of the induction motor, has relatively little torque at high speeds. This motor is unable to deliver an appreciable torque at high speed, and at low torque the speed control is not possible.

Due to this inherent disadvantage of the high resistance induction motor, the second above mentioned arrangement has not been universally accepted as a substitute for the variable speed control D.-C. motor.

I have provided a novel variable speed control unit for an induction motor which has the characteristics of a high resistance rotor for low speeds and of a low resistance rotor for high speeds. Thus, with my arrangement, the induction motor can drive a load which has a torque varying from zero to a high value, with control of the speed from zero to a maximum value and also utilizes inexpensive and dependable induction motor.

My invention is particularly directed to the wound rotor type of induction motor and not to a squirrel cage induction motor. The squirrel cage induction motor does not lend itself to variable speed control since it forces the control to assume a certain fixed resistor value which is not suitable for all the desired speeds.

Squirrel cage induction motors subjected to variable voltage control of the stator cannot operate at low speed when equipped with a low resistance squirrel cage and are unable to operate at high speed when equipped with a high resistance squirrel cage.

As noted, an induction motor with a high resistance winding will operate substantially at close to synchronous speed when there is no load on the motor. However, as the motor takes on load, the speed will be considerably reduced and when the maximum torque is obtained, the motor will stall since the high resistance rotor has maximum torque at low speed and minimum torque at full speed near synchronous R. P. M.

Thus, the high resistance squirrel cage induction motor does not lend itself to variable speed control since high speed at high torque is unattainable and low speed at low torque can only be obtained by reducing the driving voltage to close to zero.

Although this type of arrangement has operating disadvantages, it has been used in many installations since it is much more economical than the equivalent D.-C. motor and does not require rectifying means to the electrical energy supplied to the stator.

The standard wound rotor induction motor is usually equipped with a variable resistance inserted in the rotor circuit so that the desirable characteristics of a high resistance rotor at low speeds and low resistance rotor at fast speeds can be obtained in a single unit. The resistance must be varied over an extremely wide range to obtain the desired operating characteristics between high speed at high torque and low speed at low torque for any speed and any torque within this range.

However, with this arrangement, the rotor resistor must be relatively large and variable thereby introducing a component which will consume considerable power, which may not be dependable because of its slide wire construction, is expensive and requires mechanical motion to modify the effective resistance.

A wound rotor induction motor with variable resistance does not lend itself to automatic speed control, because each resistance setting corresponds to any speed between standstill and synchronism depending on the torque. If accurate speed control is required for any load torque, means must be provided to measure the speed and readjust automatically the multi-phase resistor back in the rotor circuit. Such a servo-motor circuit is slow in response, expensive and not reliable due to the mechanical wear of the many parts.

My invention is directed to a variable speed control circuit for a wound rotor induction motor which changes the effective resistance of the rotor circuit wtihout actually changing the resistance of the parts. Furthermore, this arrangement, since it is inserted in the rotor circuit, need only have a capacity to carry control and rotor currents and does not have to carry the full electrical energy of the motor as has heretofore been required for control means inserted in the stator circuit. Furthermore, this arrangement does not require a rectifier to modify the available energy and has the advantage in that the control exists on alternating current and hence, does not have the inherent time constant of the D.-C. field winding.

Basically, my invention is comprised of a first and second magnetic amplifier connected in parallel with the wound rotor with the first magnetic amplifier operating into a short-circuit and the second magnetic amplifier operating into a resistive circuit.

When the shorted magnetic amplifier and the resistive magnetic amplifier are fully conductive the wound rotor of the induction motor is practically short-circuited and hence, the induction motor operates like a normal induction motor. That is, it will run at high speeds for most torque variations that may be applied to it.

When the shorted magnetic amplifier is blocked and the resistive magnetic amplifier is conductive, then the induction motor will have the characteristics of a high resistance rotor with characteristics of high speed at low torque and low speed at high torque.

By varying the degree of saturation of the core of the shorted magnetic amplifier any point between these two extreme motor characteristics can be obtained merely by changing the magnitude of the control current in the shorted magnetic amplifier.

If both the resistive and shorted magnetic amplifier are blocked, no current will flow in the rotor of the induction motor and hence, it will be comparable to an open rotor with no torque at any speed.

Accordingly, a primary object of my invention is to provide a novel variable speed control means for the wound rotor of an induction motor which is operative to vary the speed between zero and maximum value for a torque variation from zero to maximum value.

Another object of my invention is to provide variable speed control for an electric motor which does not require the use of rectifying means for the main electrical energy supplied to the motor.

Another object of my invention is to provide means to control the speed of an induction motor wherein the control apparatus is in the rotor circuit of an induction motor and hence, does not have to conduct the full electrical energy supplied to the motor.

Still another object of my invention is to provide a variable speed control device which is operative on a relatively inexpensive induction motor.

A still further object of my invention is to provide a control means for an induction motor whereby speed variations are obtained by effectively changing the magnitude of the impedance in the rotor of the motor.

These and other objects of my invention will be apparent from the following description when taken in connection with the drawings in which:

Figure 1a illustrates the characteristic of a wound rotor induction motor having a low resistance rotor. The dotted family of curves in this figure illustrate the characteristics for variations in the magnitude of voltage supplied to the stator.

Figure 1b illustrates the characteristics of a motor with a high resistance rotor and the family of dotted curves illustrate the characteristics of the high resistance rotor with variations in the voltage supplied to the stator.

Figure 1A:
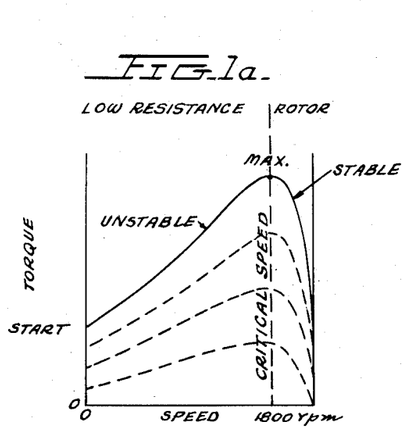
Figures 1a and 1b are characteristic curves of torque versus speed.

In Figure 1a, I have illustrated the characteristic curves which exist for a low resistance rotor showing the variation in speed for various torque conditions for a given low resistance rotor. In this arrangement, the solid line illustrates the characteristics of the motor when rated voltage is applied to the stator of the induction motor.

In this arrangement, the torque is low at both high and low speeds and reaches a maximum at an intermediate critical speed. In the event the motor is required to set high torque in the range of speed between critical and maximum speed, it will have stable operation, although the speed range is limited as illustrated.

If the motor is to deliver a high torque in the speed range between zero and critical speed, the motor will be unstable and will stall whenever the torque is higher than the starting torque. Furthermore, in this low resistance motor arrangement, the speed in the stable range of operation will be determined by the torque which the motor must deliver. In order to control the speed, the voltage applied to the stator in the induction motor will be varied.

The dotted family of characteristic curves illustrate the torque of the motor when voltage applied to the stator is lower than the rated value. Although this permits some speed control, it still does not permit operation of the motor below critical speed and in the range of stable operation between the critical and synchronous speed does not permit much change in the speed if the torque is small, and if the torque is too high, the motor will stall.

Figure 1B:
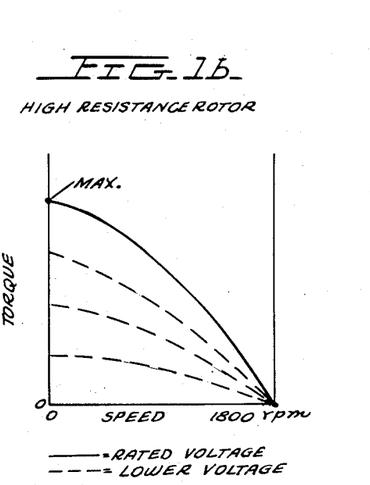

Figure 1b illustrates the characteristics of a high resistance rotor induction motor. In this figure, the solid line illustrates the characteristics when rated voltage is applied to the stator. In this arrangement, the torque of the motor is maximum at stand-still, zero at full speed and the torque speed curve continuously decreases with-in increasing speed. Thus, at low speed, there is a high torque and at high speed there is a low torque.

The high resistance induction rotor can be adapted for variable speed control by varying the voltage applied to the stator thereof. That is, by applying a voltage to the stator which is less than the rated value, characteristics similar to those indicated by the dotted lines of Figure 1b can be obtained. However, it will be noted that even with the variation in stator voltage, the maximum value of torque is achieved by zero speed so that if an existing load is placed on the motor, the unit will stall. Furthermore, the motor, even though adapted with variable voltage control for the stator, will not have a sigh torque at fast speeds and hence, is not useful in the high speed range.

Figure 2:
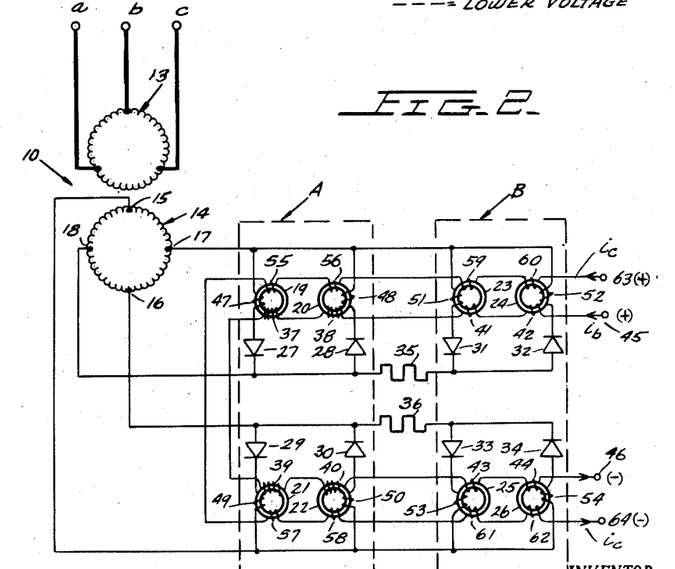
Figure 2 is a schematic wire diagram illustrating my novel maual speed control apparatus having a resistive amplifier and a shorted amplifier in the rotor circuit of a wound rotor inductor.

With the circuitry of my invention illustrated in Figure 2, I am able to obtain the desirable characteristics of a low resistance rotor indicated in Figure 1a and the desirable characteristics of a high resistance rotor indicated in Figure 1b without having the disadvantages of either.

Basically, this is achieved by having a shorted magnetic amplifier A connected directly to the rotor of an induction motor and a resistive magnetic amplifier B connected through a resistance to the same rotor of an induction motor.

In Figure 2, the induction motor has a stator 13 energized from a main power source through a three-phase circuit a, b, c, and a rotor 14. In the illustrated embodiment, the rotor is comprised of two sections which are 90° out of phase with each other. Thus, the upper half of the magnetic amplifiers A and B are associated with that portion of the rotor winding 13 between the terminals 15 and 16, 90° out of phase with the first mentioned portion.

Each section of the shorted magnetic amplifier A and the resistive magnetic amplifier B is provided with one saturable reactor which is blocked during the negative portion of the cycle and another saturable reactor which is blocked during the positive portion of the cycle. Thus, for example, the saturable reactor 19 is blocked by the rectifier 27 during the negative portion of the cycle and the saturable reactor 20 is blocked by the rectifier 28 during the positive portion of the cycle.

The components for the shorted magnetic amplifier are as follows. The saturable reactors 19, 20, 21 and 22, each of which is connected in series with rectifiers 27, 28, 29 and 30, respectively. The saturable reactors 19 and 20 are connected to the winding of the rotor 14 having terminals 17 and 18 and the saturable reactors 21 and 22 are connected to the portion of the rotor 14 having terminals 15 and 16. The rectifiers 27 and 29 block current from flowing in the saturable reactors 19 and 21, respectively, during the negative portion of the cycle and the rectifiers 28 and 30 block current from flowing in the saturable reactors 20 and 22, respectively, during the positive half portions of the cycle.

The saturable reactors 19, 20, 21 and 22 are provided with a main winding 47, 48, 49 and 50, respectively, a biasing winding 37, 38, 39 and 40, respectively, and a control winding 55, 56, 57 and 58, respectively.

The components for the resistive magnetic amplifier B are as follows. Saturable reactors 23, 24, 25 and 26 connected in series with rectifiers 31, 32, 33 and 34, respectively. The rectifiers 31 and 33 block current from flowing in the saturable reactors 23 and 25, respectively, during the negative cycle of operation and the rectifiers 32 and 34 block current from flowing in the saturable reactors 24 and 26, respectively, during the positive cycle of operation.

The saturable reactors 23, 24, 25 and 26 are provided with a main winding 51, 52, 53 and 54, respectively, a biasing winding 41, 42, 43 and 44, respectively, and control winding 59, 60, 61 and 62, respectively.

The biasing windings 37, 38, 39 and 40 for the shorted magnetic amplifier A are connected in series with each other and in series with the biasing windings 41, 42, 43 and 44 of the resistive magnetic amplifier B and are energized from a common source indicated by the positive terminals 45 and the negative terminal 46. The direct current flowing in the biasing circuit is indicated by $i_b$.

It will be noted that the biasing windings 37, 38, 39 and 40 for the shorted magnetic amplifier A have more turns than the biasing windings 41, 42, 43 and 44 of the resistive magnetic amplifier B. Since the same magnitude of current flows through the biasing windings of the shorted magnetic amplifier A as through the biasing windings of the resistive magnetic amplifier B, the M. M. F. in the saturable reactors of the amplifier A will be considerably larger than the M. M. F. in the saturable reactors of the amplifier B.

It will also be noted that the biasing windings 37, 38, 39, 40, 41, 42, 43 and 44 carry current in an opposite direction to the main windings 47, 48, 49, 50, 51, 52, 53 and 54 so that the M. M. F. from the biasing windings opposes the M. M. F. from the main windings.

The control windings 55, 56, 57 and 58 of the shorted magnetic amplifier are connected in series with each other and in series with the control windings 59, 60, 61 and 62 of the resistive magnetic amplifier B and are energized from a common source indicated by the positive terminal 63 and the negative terminal 64. The magnitude of voltage applied to the terminals 63 and 64, in the embodiment shown in Figure 2, is manually adjusted so that any desirable speed at any torque can be obtained for the induction motor 10.

As illustrated in Figure 2, the main windings 47 and 48 of the saturable reactors 19 and 20 in the upper section of the shorted magnetic amplifier A are connected directly to the winding having terminals 17 and 18 and the main windings 49 and 50 of the saturable reactors 21 and 22 in the lower section of the shorted magnetic amplifier are connected directly to the winding of the rotor 14 indicated by the terminals 15 and 16.

With regard to the resistive magnetic amplifier B, the main windings 51 and 52 of the saturable reactors 23 and 24 in the upper section are connected through the resistance 35 to the rotor winding having terminals 17 and 18 and the main windings 53 and 54 of the saturable reactors 25 and 26 in the lower section are connected through the resistor 36 to the portion of the rotor winding indicated by the terminals 15 and 16.

Hence, the current flowing through the magnetic amplifier B must pass through the resistors 35 and 36, whereas the current through the magnetic amplifier A passes directly back to the rotor 14. Also, the magnetic amplifiers A and B have an A.-C. output, with each of the amplifiers doubled for two-phase operation as noted. That is, the upper half of each amplifier is 90° out of phase with the lower half of each magnetic amplifier, wherein these phase voltages are determined by the voltage of the rotor 14.

By providing an upper and lower section for each of the magnetic amplifiers which is 90° out of phase, it is possible to provide a smooth torque for the motor. However, it will be apparent that only an upper section of the magnetic amplifiers would be required for a single phase rotor.

The arrangement illustrated in Figure 2 is preferably constructed so that all of the control windings 55 through 62 have the same number of turns and since they are all connected in series, all carry the same magnitude of control current $i_c$. These control windings are wound on their respective cores in opposite direction to the biasing windings so that the respective M. M. F. of the windings oppose each other. As noted, the biasing windings 37, 38, 39 and 40 for the shorted magnetic amplifier A contain many more turns and hence, larger M. M. F. than the biasing windings 41, 42, 43 and 44 of the resistive magnetic amplifier B.

If the control current $i_c$ is substantially smaller than the biasing current $i_b$ in any one saturable reactor, the biasing current will cause the voltage appearing on the main windings of the magnetic amplifier to completely reset the flux in the core of the saturable reactor. Thus, the saturable reactor will be blocked to prevent forward flow of current therethrough, since all of the voltage will appear across the main winding, which will appear as a high impedance.

On the other hand, if the control current $i_c$ in any one of the saturable reactors is substantially larger than the biasing current $i_b$, the flux reset during the negative half cycle of the voltage appearing on the saturable reactor will be very small. Thus, in this case, there will be practically no forward voltage drop appearing on the main winding during the forward half cycle, and hence the main winding will represent practically no impedance so that the amplifier will be conductive during this forward half cycle.

Figure 3:
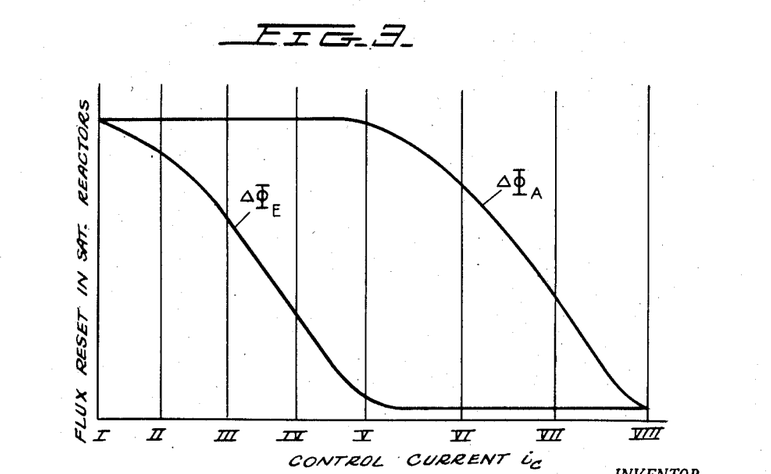
Figure 3 is a plot of flux reversed or flux reset in the saturable reactors of the magnetic amplifiers used in my invention, illustrating the difference in characteristics between the resistive magnetic amplifier and the shorted magnetic amplifier.

The characteristic curves illustrating the relationship of the magnitude of control current to prevent flux reset for the resistive magnetic amplifier B and the shorted magnetic amplifier A is illustrated in Figure 3 wherein the ordinate shows the flux which is reset in the core of the saturable reactors during each half cycle and the abscissa shows the various magnitudes of control current $i_c$ which can be supplied to the control windings 55 through 62 from the variable voltage source indicated by the positive terminal 63 and the negative terminal 64.

Figure 4:
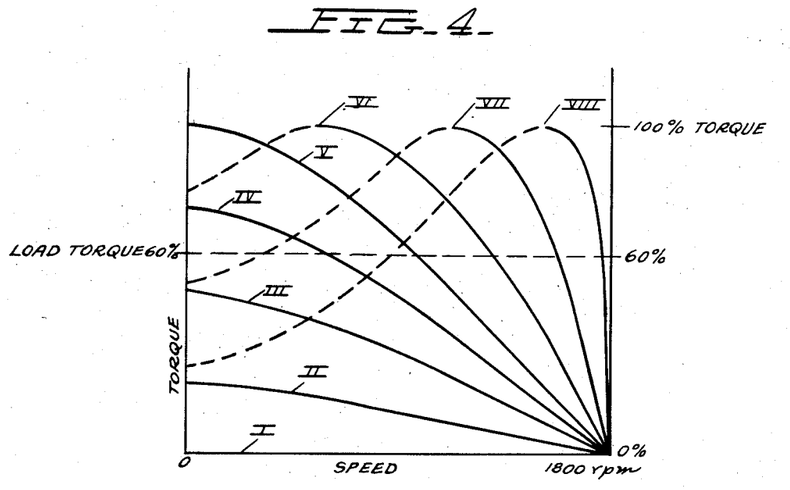
Figure 4 illustrates the various characteristics which may be obtained with the novel circuitry of Figure 2.

The operation of the variable speed control device illustrated in Figure 3 can be best understood by illustrating the various conditions which exist as illustrated in Figures 3 and 4 for all magnitudes of control current $i_c$.

I. When the control current $i_c$ is zero, the flux in both the shorted magnetic amplifier A and the resistive magnetic amplifier B will be completely reset during the reverse half cycle, and hence all main windings during their normal forward cycle will block the flow of current. As a result of this, there will be an effective infinite impedance across the rotor windings 14 and hence, zero current will flow in the rotor winding. The control current $i_c$ is indicated by the Roman numeral I in Figures 3 and 4. Under these conditions, the motor will have zero torque for all speeds from zero to synchronous speed.

II. As the magnitude of control current increases to the magnitude indicated by the Roman numeral II, the flux in the shorted magnetic amplifier A will be completely reset as indicated in Figure 3 since the M. M. F. from the control windings 55, 56, 57 and 58 is not sufficient to overcome the large magnitude of M. M. F. from the biasing windings 37, 38, 39 and 40. However, in the resistive magnetic amplifier B, the M. M. F. from the biasing windings 41, 42, 43 and 44 is considerably smaller due to the fact that these biasing windings have less turns than the biasing windings on the cores in the shorted magnetic amplifier A. Hence, this given magnitude of control current II will be sufficient to partially overcome the M. M. F. of the biasing windings in the resistive magnetic amplifier B so that the flux in the resistive magnetic amplifier B will not be completely reset as shown under II in Figure 3. A maximum magnitude of resistance, equal to that of resistors 35 and 36, will be inserted in series with the rotor windings 14. However, since the resistive magnetic amplifier B is still partially blocked, the magnitude of current flowing in the rotor 14 will be limited and hence, the characteristics of the motor will be as indicated by curve II in Figure 4; the torque of the motor is small at standstill and decreases gradually to zero when the speed increases. The motor will have stability for low speeds and low torques, a characteristic which was not heretofore available in a low resistance rotor as illustrated in Figure 1a.

III. If the magnitude of control current $i_c$ is increased to the magnitude indicated by the Roman numeral III, in Figure 3 the M. M. F. of the main windings in the shorted magnetic amplifier A will still be insufficient to prevent flux reversal in the cores of the shorted magnetic amplifier A during the reverse cycle. Hence, there will be a complete flux reset for the saturable reactors 19, 20, 21 and 22 and no current will flow in the main windings of these reactors during the conducting cycle. However, the increase of control current $i_c$ to the magnitude III will only permit a partial flux reversal which is less than the flux reversal encountered with a magnitude of control current equal to II. Thus, the effective resistance for the rotor windings 14 will still be equal to that of the resistors 35 and 36. However, the magnitude of current flowing therein will be slightly greater than previously existed under the conditions noted above in paragraph II since the degree of flux reversal in the saturable reactors 23, 24, 25 and 26 is less. A comparison of the degree of flux reversal for conditions II and III is indicated in Figure 3. Under these conditions, as seen in Figure 4, the motor has a similar torque-speed characteristic but for substantially higher torques than were previously available for a control current having a magnitude II.

IV. If the control current is increased still further, that is for conditions for which it is desirable to operate the motor at relatively low speeds but for high torques, the magnitude of M. M. F. from the control windings in the shorted magnetic amplifier A will still be insufficient to prevent complete flux reversal in the cores of this amplifier during the reverse cycle. Hence, during the forward cycle, the shorted magnetic amplifier A will be the equivalent to an infinite impedance circuit and will completely block the flow of current therethrough. However, there will be less flux reversal in the resistive magnetic amplifier B during the reverse cycle as best seen in Figure 3 and thus, the characteristics illustrated in Figure 4 will be achieved.

V. If it is desired to operate the motor at a low speed and for very high magnitudes of motor torque, the control current $i_c$ will be increased to the magnitude of the current indicated by V. Under these conditions, the resistive magnetic amplifier B will have no flux reversal, as shown in Figure 3. That is, the M. M. F. of the control windings will be sufficient to completely oppose the M. M. F. of the biasing windings so that no flux reversal or reset will occur in the cores of this amplifier during the reverse cycle. However, this magnitude of control current is still insufficient to oppose the very large M. M. F. from the biasing windings of the shorted magnetic amplifier A and hence, this amplifier will be blocking during the forward cycle. It will be noted that under these conditions, the magnitude of current flowing through the rotor winding 14 will be larger than the magnitude of current which heretofore flowed through that winding for the conditions I, II, III and IV. However, the magnitude of resistance in the rotor winding, namely the magnitude of the resistance 35 and 36, will be identical for conditions I, II, III, IV and V. Under these conditions, a maximum magnitude of motor torque can be obtained for low speeds of the induction motor 10, as indicated in Figure 4.

VI. If the magnitude of control current $i_c$ is increased still further to a value indicated by the Roman numeral VI, the M. M. F. in the shorted magnetic amplifier A will now be sufficient to prevent complete flux reversal in the cores 19, 20, 21 and 22 during the reverse cycle and as noted for the smaller magnitude of control current V, there will be no flux reversal in the cores 23 and 26 of the resistive magnetic amplifier B, as shown under V in Figure 3. Thus, the shorted magnetic amplifier A will be partially blocked during the forward cycle; however, it will be shunted by the resistors 35 and 36. Thus, since the resistive magnetic amplifier B has an effective zero impedance during the conductive cycle, current will flow through a first path comprised of the partially blocked shorted magnetic amplifier A and a second path comprised of the resistors 35 and 36 and the completely conductive resistive magnetic amplifier B. Hence, there is not an effective resistance in parallel with the resistors 35 and 36 so that the magnitude of resistance inserted in series with the rotor winding 14 will be less than the magnitude of resistor 35 or 36. Thus, the characteristic illustrated in Figure 4 for the magnitude of control current VI can now be obtained whereby a maximum motor torque can be obtained for the low range of motor speeds.

VII. If the magnitude of control current is increased still further, the degree of flux reversal in the shorted magnetic amplifier will be less than has heretofore been obtained as indicated in Figure 3 and hence, the effective resistance for the rotor 14 will be decreased and hence, a maximum motor torque can be obtained for higher ranges of motor speed as indicated in Figure 4.

VIII. If the control voltage is increased to a maximum magnitude indicated by the Roman numeral VIII, both the magnetic shorted amplifier A and the resistive magnetic amplifier B will have no flux reversal, as indicated in Figure 3 and hence, will be fully conductive during the forward cycle. Under these conditions, the shorted magnetic amplifier A will short-circuit the resistor 35 so that an effective zero magnitude of resistance will be inserted in the circuit of the rotor 14. Hence, large motor torques can be obtained for high speeds of the induction motor 10, as indicated in Figure 4. The induction motor with its low resistance rotor 14 will thus have the desirable characteristics indicated in Figure 1a. That is, the induction motor now operates like an induction motor with a shorted rotor with low resistance which has an efficient induction motor operating at full speed and large torque.

Thus, in summary, it will be noted that by providing means to control the magnitude of control current $i_c$, the speed of the induction motor 10 can be maintained at any magnitude for any torque of the load. This small value of D.-C. control current $i_c$ determines the speed of the motor together with the torque applied to it.

It will be noted that the voltage and frequency appearing on the magnetic amplifiers A and B will be variable. However, this frequency and voltage variation will not affect the operation of the magnetic amplifiers since the induction motor will have approximately a constant average voltage over each half cycle of operation so that the flux change corresponding to the voltage in any one half cycle is always the same. This inherent characteristic of constant average voltage over a half cycle permits the use of magnetic amplifiers of the rotor circuit of the induction motor.

The speed control circuit illustrated in Figure 2 is designed for the voltages which will appear on the rotor 14 of the induction motor 10 and the current flowing through the rotor, during the starting operation under heavy torque, the rotor will carry large magnitude of current. However the rotor circuit is practically resistive so that the voltage on the rotor will bear entirely on the resistors 35 and 36. Since the power factor of the rotor power will be substantially equal to one, the power to be handled by the magnetic amplifiers A and B will be substantially equal to the power which must be handled by the rotor 10 and no more. However, this magnitude of power is relatively small when compared to the magnitude of power which must be handled by the stator 13 of the induction motor 10.

The large magnitude of power handled by the stator 13 is composed of the following four major components. (1) The active mechanical power delivered by the induction motor 10. (2) The losses due to the stator resistance and the reactive power of the stator reactance. (3) The reactive power of the air gap reactance. (4) The power dissipated in the rotor winding plus power dissipated in the magnetic amplifiers A and B.

Thus, it will be apparent that the variable speed control apparatus indicated in Figure 2 need only handle a small percentage of the total power which must be handled by the induction motor and hence, the control apparatus can be made relatively small and inexpensive.

Furthermore, since all of the components of the control apparatus are stationary and static, they are free from wear and will require little or no maintenance.

In the embodiment illustrated in Figure 2, there has been shown and described a system whereby any speed for any motor torque can be obtained simply by manually varying the magnitude of control current $i_c$. However, in some installation, it may be desirable to maintain a constant torque regardless of the speed of the induction motor. It will be apparent that the arrangement of Figure 2 can be utilized for this type of arrangement.

Thus, assuming that the load of the motor requires a constant torque equal to 60% of maximum load torque, indicated by the horizontal dotted line of Figure 4, regardless of the speed of the motor. By plotting speed versus control current $i_c$, as indicated in Figure 5, the characteristics of the induction motor 10 for this load conditions can be obtained.

Figure 5:
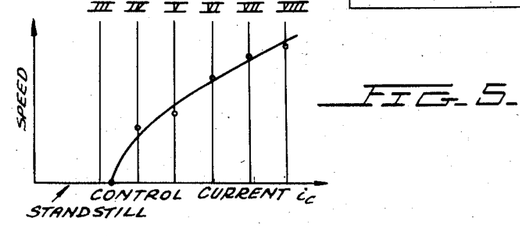
Figure 5 illustrates a graphic representation of speed versus control current for a motor operating at constant 60% of maximum torque.
Figure 6:
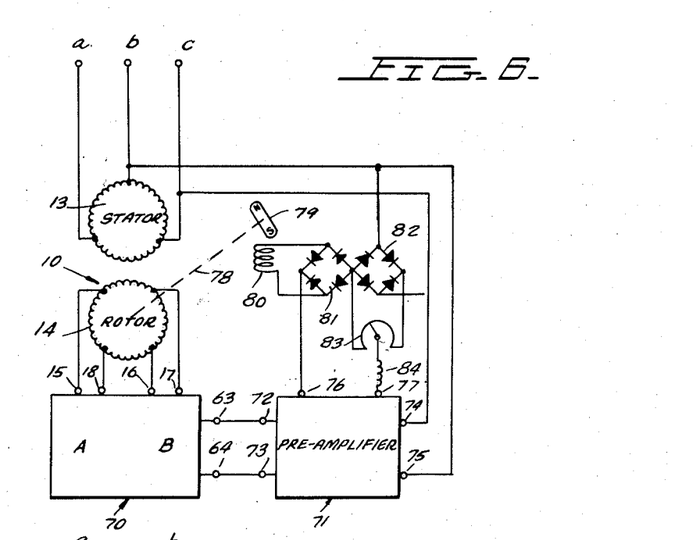
Figure 6 is a schematic wiring diagram illustrating the manner in which my invention can be utilized as an automatic control to maintain a fixed speed of a wound rotor induction motor for all torque variations.

From the curve of Figure 5, the magnitude of control current $i_c$ which must be supplied to the magnetic amplifiers A and B can be determined over all magnitudes of speed.

Furthermore, assuming that there is a steady load torque equal to 60% of the maximum, and automatic adjustment of control current responsive to the speed of the rotor 14 can be provided to supply the necessary magnitude of control current $i_c$ as indicated in Figure 5, to maintain the speed of any desired value.

The arrangement of Figure 2 can also be used as a control system in which the speed of the induction motor 10 is to remain constant for all values of load torque.

A typical constant speed application of my invention is illustrated in the schematic wiring diagram of Figure 3. In this illustration, the induction motor 10 is provided with a stator 13 and a rotor 14. The shorted and resistive magnetic amplifiers A and B of Figure 2 are contained within the box 70 of Figure 3.

The terminals 63 and 64 of Figure 3 correspond to the positive and negative terminals 63 and 64 of the control circuit illustrated in Figure 2. The means to control the magnitude of control current $i_c$ in order to obtain constant speed for all magnitudes of load torque will now be described.

A pre-amplifier, which may also be a magnetic amplifier, is shown in the box 71 and has output terminals 72 and 73 connected to the control terminals 63 and 64 of the control magnetic amplifiers A and B in box 70. The pre-amplifier 71 has a main source of energy supplied thereto at the terminals 74 and 75 which receive their energy from the main power source lines $b$ and $c$.

The control for the magnetic pre-amplifier 71 is obtained through terminals 76 and 77. A constant speed control is obtained by means of a small voltage generator which consists of the permanent magnet 79 fastened to the shaft 78 of the induction motor rotor 14. The permanent magnet 79 induces a voltage in the coil 80 which is proportional to the speed of the induction motor and has a variable frequency.

The A.-C. voltage generated in the coil 80 is rectified in the rectifier 81. A constant supply voltage rectifier 82 is energized from a constant source of alternating current voltage which in the illustration is obtained from the main power terminals $b$ and $c$.

The constant D.-C. voltage output from the rectifier 82 is supplied to the potentiometer 83. The voltage appearing on the terminal 76 and the center of the potentiometer 83 is the difference between the voltage rectified by the rectifier 81 and the voltage appearing on one side of the potentiometer 83.

The time integral of the voltage difference generates a control current which will flow through the coil 84 and controls the magnetic pre-amplifier 71.

If the speed of the induction motor 10 increases above a predetermined desired magnitude, then the permanent magnet 79 will induce a higher voltage in the coil 80 so that the output voltage of the rectifier 81 will over-compensate the voltage appearing on the potentiometer 83 and hence, the control current flowing in the coil 84 will decrease. This in turn will decrease the output of the pre-amplifier 71 so that a smaller magnitude of control current will be supplied to the terminals 63 and 64, which increases the effective resistance of the rotor 14, thereby causing the induction motor 10 to slow down.

In like manner, if the speed of the induction motor 10 is below a desired predetermined value, the permanent magnet 79 will induce a lower voltage in the coil 80 so that the voltage appearing across the potentiometer 83 will be larger than the voltage appearing across the rectifier 81. Hence, the magnitude of current in the coil 84 will increase, which in turn will increase the output of the magnetic amplifier 71, which will decrease the degree of flux reversal in the magnetic amplifiers A and B in box 70, to thereby increase the magnitude of rotor current and again increase the speed of the rotor 14. Hence, by means of this simple circuit, the speed of the induction motor can be held constant for all magnitudes of load torque.

Figure 7:
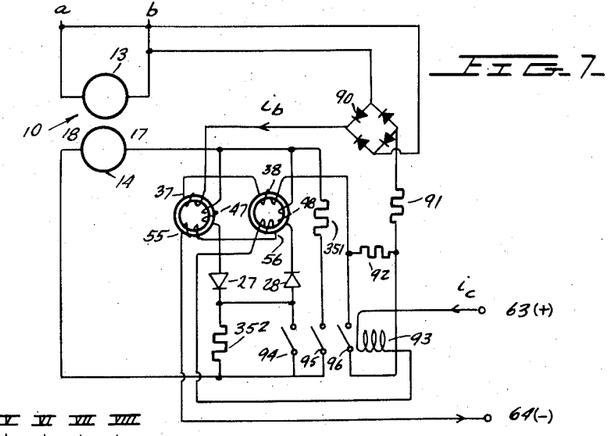
Figure 7 is an illustration of another form of my invention showing a motor controlled similar to that of Figure 2 but using only one magnetic amplifier.

In Figure 7 I have shown a slight variation of my novel motor control circuit in single phase diagram. The illustration of Figure 7 is similar to the illustration of Figure 2 except a single magnetic amplifier functions as either an A or B amplifier depending on the magnitude of control current $i_c$. In the embodiment of Figure 7, all components which are similar to those heretofore noted are identified by similar numerals. The operation of the circuit is as follows:

When the magnitude of control current $i_c$ is small, the relay coil 93 will not be sufficiently energized to close contacts 94, 95 and 96. Hence, since contact 96 is open, resistor 92 will be in the biasing circuit and hence $i_b$ will be small. Also since contact 94 is open, the main windings 47, 48 of the amplifier will be in series with the resistor 352 and hence functions as a B amplifier as noted for Figure 2. By increasing the magnitude of $i_c$, but still having a magnitude insufficient to energize the relay coil 93 to close its contacts 94, 95, 96 it is possible to obtain complete variation along the curves I, II, III, IV, V of Figure 4.

By increasing the magnitude of $i_c$ to a value which will sufficiently energize the relay coil 93 so that its contacts 94, 95 and 96 will be closed the unit will have the characteristics for the remaining range of torque and speed. That is, with contact 94 closed, resistor 352 will be short circuited, with contact 95 closed, resistor 351 will be inserted in parallel with the amplifier, and with contact 96 closed resistor 92 will be short-circuited to thereby give a larger magnitude of biasing current $i_b$ so that the amplifier will now function as an A amplifier as noted in Figure 2. By increasing the magnitude of the control current $i_c$ it is possible to obtain all the characteristics of curves V, VI, VII, VIII in Figure 4. It will be apparent that the arrangement shown in Figure 7 can also be applied to a 2 or 3 phase rotor. Also it should be noted that in some installation where characteristics similar to those of curves I to V are desired, the motor control circuit can eliminate the relay 93 so that conductive means such as resistors 352 and 93 are always in the circuit to thereby permit the amplifier to always function as a B amplifier. On the other hand if only characteristics similar to those of curves V to VII are desired both resistors 352 and 92 can be eliminated so that conducting means, such as resistor 351 is always in parallel with the amplifier and hence it will always function as an A amplifier.

I claim:

1. A variable speed control means for an induction motor; said induction motor having a stator and a wound rotor; said variable speed control means operatively connected to said wound rotor to modify the effective resistance and current flow in said rotor during continuous operation thereof; said variable speed control means comprising a first and a second impedance and a magnetic amplifier, said magnetic amplifier connected in series with said wound rotor, a means to selectively connect said first impedance in parallel with said magnetic amplifier and said second impedance in series with said magnetic amplifier.

2. A variable speed control means for an induction motor; said induction motor having a stator and a wound rotor; said variable speed control means operatively connected to said wound rotor to modify the effective resistance and current flow in said rotor during continuous operation thereof; said variable speed control means comprising a first and second magnetic amplifier connected in parallel with each other and with said wound rotor; said first magnetic amplifier effective to short-circuit said wound rotor when said first amplifier is conductive; said second magnetic amplifier being operative to insert resistance in said wound rotor circuit when said first amplifier is blocked and said second amplifier is conductive.

3. A variable speed means for an induction motor; said induction motor having a stator and a rotor; said variable speed means comprised of a first and second magnetic amplifier; said first amplifier connected across the rotor of said induction motor; said second amplifier connected in series with a resistance to form a first series path; said series path connected in parallel with said rotor and said first amplifier; control means for said first and second amplifier to modify the effective resistance and current of said rotor during continuous operation thereof to thereby permit speed control of said induction motor.

4. An induction motor having a variable speed control; said motor having a stator winding and a rotor winding; said variable speed control being comprised of a saturable reactor; said saturable reactor having a main winding connected in parallel with said rotor winding; a biasing winding for said saturable reactor; said biasing winding connected to and energized from a biasing current electrical source; the ampere turns of said biasing winding being opposite to the ampere turns of said main winding; a control winding for said saturable reactor a first magnitude of current in said control winding ineffective to saturate said saturable reactor; a second magnitude of current for said control winding effective to saturate said saturable reactor, means to selectively connect impedance in series and parallel with said main winding.

5. An induction motor having a variable speed control; said motor having a stator winding and a rotor winding; said variable speed control being comprised of a first and a second saturable reactor; said first saturable reactor having a main winding connected in parallel with said rotor winding; said second saturable reactor having a main winding; a resistor; said main winding of said second saturable reactor connected through said resistor to said rotor winding; a biasing winding for each of said first and second saturable reactor; said biasing windings for said first and second saturable reactor connected in series and energized from a common biasing current electrical source; ampere turns of said biasing windings of said first and second saturable reactors being opposite to the ampere turns of said main windings of said first and second saturable reactors respectively; said biasing winding of said first saturable reactor having more turns than said biasing winding of said second saturable reactor; said first and second saturable reactor each having a control winding; said control windings of said first and second saturable reactor being connected in series and energized from a common control current electrical source; a first magnitude of current in said control windings effective to saturate said second saturable reactor and ineffective to saturate said first saturable reactor; a second magnitude of current for said control windings effective to saturate said first and second saturable reactors.

6. A variable speed control device for an induction motor; said induction motor having a stator winding and a rotor winding; a main source of electrical energy for said stator winding; said variable speed control device being comprised of a first and second magnetic amplifier; said first magnetic amplifier connected directly to said rotor winding; said second magnetic amplifier connected through a resistor to said rotor winding; control means to block the operation of said second magnetic amplifier and create an effective short-circuit for said rotor winding through said first magnetic amplifier; said control means being further constructed to block said first magnetic amplifier to thereby effectively insert said resistor in the circuit of said rotor winding through said second magnetic amplifier; said control means being further constructed to block the operation of said first and second magnetic amplifier to thereby effect an equivalent open circuit for said rotor winding; said control means being operative during continuous operation of said induction motor.

7. A variable speed control device for an induction motor; said induction motor having a stator winding and a rotor winding; a main source of electrical energy for said stator winding; said variable speed control device being comprised of a first and second magnetic amplifier; said first magnetic amplifier connected directly to said rotor winding; said second magnetic amplifier connected through a resistor to said rotor winding; control means to block the operation of said second magnetic amplifier and create an effective short-circuit for said rotor winding through said first magnetic amplifier; said control means being further constructed to block said first magnetic amplifier to thereby effectively insert said resistor in the circuit of said rotor winding through said second magnetic amplifier; said control means being further constructed to block the operation of said first and second magnetic amplifier to thereby effect an equivalent open circuit for said rotor winding said control means being operative during continuous operation of said motor; said means being manually controlled.

8. A variable speed control device for an induction motor; said induction motor having a stator winding and a rotor winding; a main source of electrical energy for said stator winding; said variable speed control device being comprised of a first and second magnetic amplifier; said first magnetic amplifier connected directly to said rotor winding; said second magnetic amplifier connected through a resistor to said rotor winding; control means to block the operation of said second magnetic amplifier and create an effective short-circuit for said rotor winding through said first magnetic amplifier; said control means being further constructed to block said first magnetic amplifier to thereby effectively insert said resistor in the circuit of said rotor winding through said second magnetic amplifier; said means being further constructed to block the operation of said first and second magnetic amplifier to thereby effect an equivalent open circuit for said rotor winding said control means being operative during continuous operation of said motor; said means being automatically controlled to thereby maintain the speed of said induction motor at a given value for all values of torque of said induction motor.

9. A variable speed control device for an induction motor; said induction motor having a stator winding and a rotor winding; a main source of electrical energy for said stator winding; said variable speed control device being comprised of a first and second magnetic amplifier; said first magnetic amplifier connected directly to said rotor winding; said second magnetic amplifier connected through a resistor to said rotor winding; control means to block the operation of said second magnetic amplifier and create an effective short-circuit for said rotor winding through said first magnetic amplifier; said control means being further constructed to block said first magnetic amplifier to thereby effectively insert said resistor in the circuit of said rotor winding through said second magnetic amplifier; said control means being further constructed to block the operation of said first and second magnetic amplifier to thereby effect an equivalent open circuit for said rotor winding said control means being operative during continuous operating of said motor; said means being comprised of a biasing circuit and a control circuit for said first and second magnetic amplifiers.

10. A constant speed control device for an induction motor; said induction motor having a stator winding and a rotor winding; a main source of electrical energy for said stator winding; said constant speed control device being comprised of a first and second magnetic amplifier; said first magnetic amplifier connected directly to said rotor winding; said second magnetic amplifier connected through a resistor to said rotor winding; control means to block the operation of said second magnetic amplifier and create an effective short-circuit for said rotor winding through said first magnetic amplifier; said control means being further constructed to block said first magnetic amplifier to thereby effectively insert said resistor in the circuit of said rotor winding through said second magnetic amplifier; said control means being further constructed to block the operation of said first and second magnetic amplifier to thereby effect an equivalent open circuit for said rotor winding; said control means being operative during continuous operation of said induction motor; said control means being comprised of a biasing circuit and a control circuit for said first and second magnetic amplifiers; an automatic control for said control means to maintain the speed of said induction motor constant for all values of torque; said automatic control being comprised of a source of energy for said control circuit; said source of electrical energy controlled from a standard voltage source and a variable voltage; said variable voltage source responsive to the speed of said induction motor.

11. A variable speed control device for an induction motor; said induction motor having a stator winding and a rotor winding; a main source of electrical energy for said stator winding; said variable speed control device being comprised of a first and second magnetic amplifier; said first magnetic amplifier connected directly to said rotor winding; said second magnetic amplifier connected through a resistor to said rotor winding; control means to block the operation of said second magnetic amplifier and create an effective short-circuit for said rotor winding through said first magnetic amplifier; said control means being further constructed to block said first magnetic amplifier to thereby effectively insert said resistor in the circuit of said rotor winding through said second magnetic amplifier; said control means being further constructed to block the operation of said first and second magnetic amplifier to thereby effect an equivalent open circuit for said rotor winding said control means being operative during continuous operation of said motor; a resistor and a first and second magnetic amplifier combination for each phase of said rotor winding.

12. A variable speed control device for an induction motor; said induction motor having a stator winding and a rotor winding; a main source of electrical energy for said stator winding; said variable speed control device being comprised of a first and second magnetic amplifier; said first magnetic amplifier connected directly to said rotor winding; said second magnetic amplifier connected through a resistor to said rotor winding; control means to block the operation of said second magnetic amplifier and create an effective short-circuit for said rotor winding through said first magnetic amplifier; said control means being further constructed to block said first magnetic amplifier to thereby effectively insert said resistor in the circuit of said rotor winding through said second magnetic amplifier; said control means being further constructed to block the operation of said first and second magnetic amplifier to thereby effect an equivalent open circuit for said rotor winding said control means being operative during continous operation of said motor; said first and second magnetic amplifier each being comprised of a saturable reactor operative during the positive half cycle of operation and a saturable reactor operative during the negative half cycle of operation.

13. A variable speed control device for an induction motor; said induction motor having a stator winding and a rotor winding; a main source of electrical energy for said stator winding; said variable speed control device being comprised of a first and second magnetic amplifier; said first magnetic amplifier connected directly to said rotor winding; said second magnetic amplifier connected through a resistor to said rotor winding; control means to block the operation of said second magnetic amplifier and create an effective short-circuit for said rotor winding through said first magnetic amplifier; said control means being further constructed to block said first magnetic amplifier and effectively insert said resistor in the circuit of said rotor winding through said second magnetic amplifier; said control means being further constructed to block the operation of said first and second magnetic amplifier to thereby effect an equivalent open circuit for said rotor winding; said control means being operative during continuous operation of said induction motor said first and second magnetic amplifier each being comprised of a saturable reactor operative during the positive half cycle of operation and a saturable reactor operative during the negative half cycle of operation; a resistor and a first and second magnetic amplifier combination for each phase of said rotor winding.

14. A variable speed control device for an induction motor; said induction motor having a stator winding and a rotor winding; a main source of electrical energy for said stator winding; said variable speed control device being comprised of a first and second magnetic amplifier; said first magnetic amplifier connected directly to said rotor winding; said second magnetic amplifier connected through a resistor to said rotor winding; control means to block the operation of said second magnetic amplifier and create an effective short-circuit for said rotor winding through said first magnetic amplifier; said control means being further constructed to block said first magnetic amplifier to thereby effectively insert said resistor in the circuit of said rotor winding through said second magnetic amplifier; said control means being further constructed to block the operation of said first and second magnetic amplifier to thereby effect an equivalent open circuit for said rotor winding; said first and second magnetic amplifiers each being comprised of two saturable reactors each of which has a rectifying means associated therewith; one of said rectifiers effective to block the operation of one of said saturable reactors during the positive half cycle of operation; the other of said rectifying means operative to block the operation of the other saturable reactor during the negative half cycle of operation.

15. A variable speed control device for an induction motor; said induction motor having a stator winding and a rotor winding; a main source of electrical energy for said stator winding; said variable speed control device being comprised of a first and second magnetic amplifier; said first magnetic amplifier connected directly to said rotor winding; said second magnetic amplifier connected through a resistor to said rotor winding; control means to block the operation of said second magnetic amplifier and create an effective short-circuit for said rotor winding through said first magnetic amplifier; said control means being further constructed to block said first magnetic amplifier to thereby effectively insert said resistor in the circuit of said rotor winding through said second magnetic amplifier; said control means being further constructed to block the operation of said first and second magnetic amplifier to thereby effect an equivalent open circuit for said rotor winding; said first and second magnetic amplifiers each being comprised of two saturable reactors each of which has a rectifying means associated therewith; one of said rectifiers effective to block the operation of one of said saturable reactors during the positive half cycle of operation; the other of said rectifying means operative to block the operation of the other saturable reactor during the negative half cycle of operation; a resistor and a first and second magnetic amplifier combination for each phase of said rotor winding.

16. A constant speed control device for an induction motor; said induction motor having a stator winding and a rotor winding; a main source of electrical energy for said stator winding; said constant speed control device being comprised of a first and second magnetic amplifier; said first magnetic amplifier connected directly to said rotor winding; said second magnetic amplifier connected through a resistor to said rotor winding; control means to block the operation of said second magnetic amplifier and create an effective short-circuit for said rotor winding through said first magnetic amplifier; said control means being further constructed to block said first magnetic amplifier to thereby effectively insert said resistor in the circuit of said rotor winding through said second magnetic amplifier; said control means being further constructed to block the operation of said first and second magnetic amplifier to thereby effect an equivalent open circuit for said rotor winding; said means being comprised of a biasing circuit and a control circuit for said first and second magnetic amplifier; an automatic control for said means to maintain the speed of said induction motor constant for all values of torque; said automatic control being comprised of a source of energy for said control circuit, said source of electrical energy controlled from a standard voltage source and a variable voltage source; said variable voltage source responsive to the speed of said induction motor.

References Cited in the file of this patent
UNITED STATES PATENTS

| | | |
|---|---|---|
| 1,503,213 | Stoekle | July 29, 1924 |
| 2,013,221 | Stansbury | Sept. 3, 1935 |
| 2,379,146 | Griscom et al. | June 26, 1945 |
| 2,528,467 | Bulliet | Oct. 31, 1950 |